Patented Aug. 10, 1954

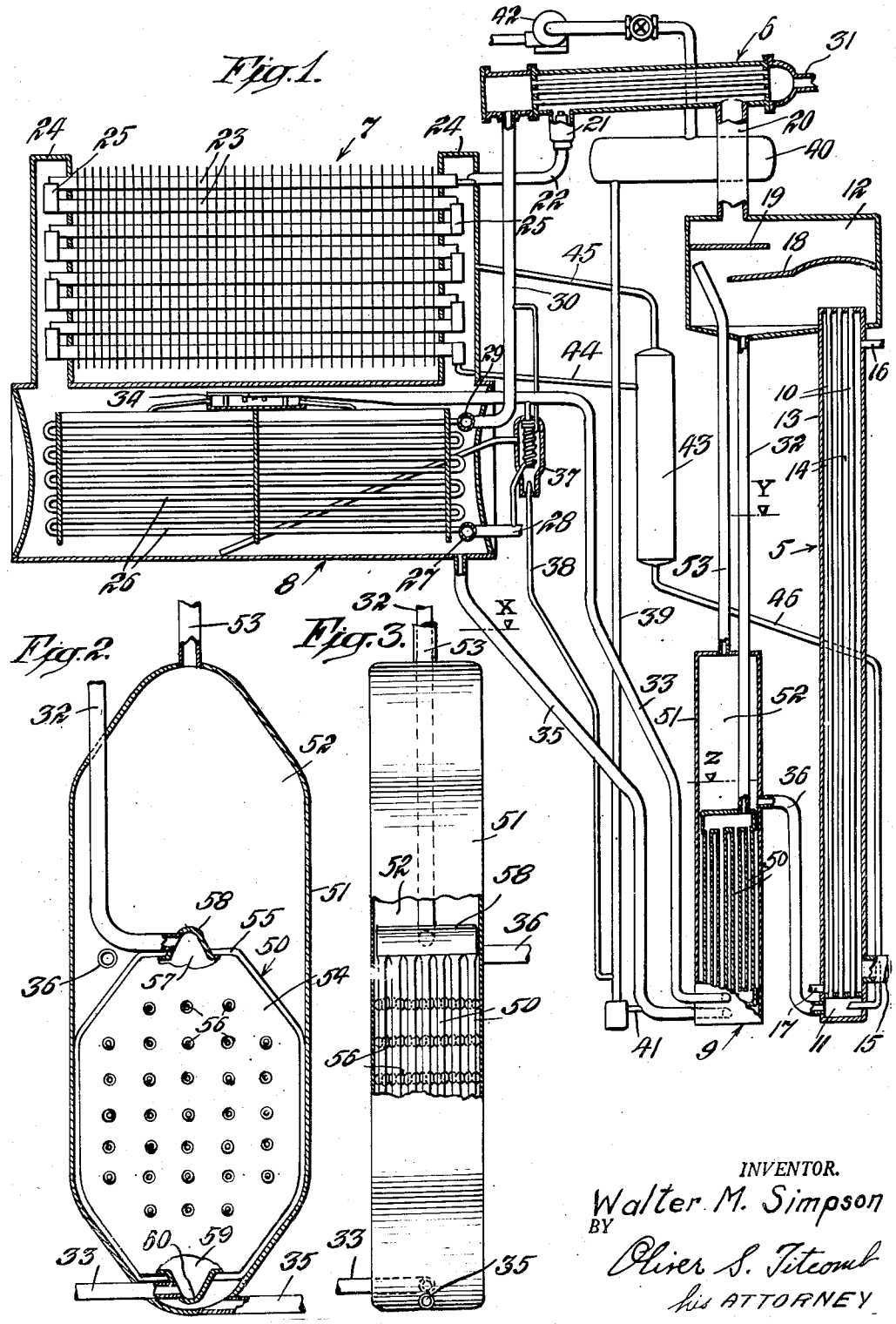

2,685,781

UNITED STATES PATENT OFFICE 2,685,781

LEVELING VESSEL WITH HEAT EXCHANGE THEREIN

Walter M. Simpson, Evansville, Ind., assignor to Servel, Inc., New York, N. Y., a corporation of Delaware Application September 27, 1949, Serial No. 118,035

1 Claim. (Cl. 62—119)

The present invention relates to refrigeration and more particularly to the absorption liquid circuit of an absorption refrigeration system.

The present invention may be used in other absorption refrigeration systems but is particularly adapted for vacuum type two-pressure absorption refrigeration systems of the kind illustrated and described in my prior United States Letters Patent No. 2,456,455 issued December 14, 1948 entitled Heat Exchanger. The patent discloses an absorption solution circuit comprising a generator, an absorber and conduit means to provide separate paths of flow for solution weak in refrigerant flowing toward the absorber and solution strong in refrigerant flowing toward the generator. A vapor liquid-lift utilizing refrigerant vapor expelled in the generator raises the solution for gravity flow through the circuit. A heat exchanger in the circuit transfers heat from the relatively hot solution flowing from the generator to the relatively cold solution flowing toward the generator and a separate reservoir vessel located above the base of the generator receives solution from the heat exchanger and maintains a hydrostatic reaction head on the vapor liquid-lift.

One of the objects of the present invention is to provide a unitary structure in the solution circuit for exchanging heat between the solution in the separate paths of flow and maintaining a hydrostatic reaction head on the vapor liquid-lift.

Another object is to provide a unitary structure in the absorption solution circuit which constitutes a heat exchanger in its lower portion and a reservoir for solution in its upper portion.

Still another object of the present invention is to provide a combined heat exchanger and reservoir vessel which requires less space, fewer parts and less material than the constructions previously used and which reduces the heat loss from the heat exchanger.

These and other objects will become more apparent from the following description and drawing in which like reference characters denote like parts throughout the several views. It is to be expressly understood, however, that the drawing is for the purpose of illustration only and not a definition of the limits of the invention, reference being had for this purpose to the appended claim. In the drawing:

Fig. 1 is a diagrammatic view of an absorption refrigeration system incorporating the combined heat exchanger and reservoir vessel of the present invention.

Fig. 2 is an enlarged front sectional view of the combined heat exchanger and reservoir vessel showing one of the compartments of the heat exchanger and the connections thereto, and Fig. 3 is a side elevational view of the combined heat exchanger and reservoir vessel partly in section and showing the spaced compartments providing separate paths of flow through and between the compartments.

In the drawing the present invention is shown applied to a vacuum type absorption refrigeration system utilizing water as a refrigerant and a salt solution as an absorbent and is generally similar to that illustrated and described in my prior United States Letters Patent No. 2,456,455 referred to above. The refrigeration system comprises a generator 5, a condenser 6, an evaporator 7, an absorber 8 and heat exchanger 9, later to be described in detail, interconnected to provide circuits for refrigerant and absorbent.

The generator 5 constitutes a vapor liquid-lift and comprises a plurality of upright tubes 10 connected at their lower ends to an inlet chamber 11 and at their upper ends to a separating chamber 12. Tubes 10 are enclosed in a jacket 13 to provide a heating chamber 14 therebetween. Steam or other heating medium is supplied to the heating chamber 14 from any suitable source through a conduit 15. A vent pipe 16 connects the chamber 14 to the atmosphere at a point remote from the inlet conduit 15 to maintain the steam in the heating chamber at atmospheric pressure. A condensate drain 17 is provided adjacent the lower end of the heating chamber 14. When steam is supplied to the heating chamber 14 its heat is transferred through the tubes 10 and expels refrigerant vapor, such as water, from the absorption solution, such as a water solution of a hygroscopic salt, and the expelled vapor acts to lift the solution in the tubes by a climbing film vapor-lift action to the separating chamber 12.

The separating chamber 12 of the generator 5 may have any desired shape and in the illustrated embodiment is rectangular in side elevation and oval in plan to adapt it to fit the available space. Baffles 18 and 19 extend between the sides of the separating chamber 12 to separate solution from refrigerant vapor and also to strengthen the chamber. The top of the separating chamber 12 is connected to the condenser 6 by a conduit 20 and the condenser, in turn, is connected to the evaporator 7 by a conduit including a liquid receiving vessel 21 and a pipe 22. The vessel 21 in the conduit has an orifice (not shown) of a size to pass all of the liquid refrigerant condensed in the condenser 6 and permit a limited flow of refrigerant vapor to purge non-condensable gases from the condenser as claimed in a co-pending application for United States Letters Patent of Norton E. Berry, Serial No. 725,000, filed January 29, 1947, now Patent No. 2,563,575, dated August 7, 1951, and entitled Refrigeration.

Evaporator 7 comprises a plurality of substantially horizontal finned tubes 23 extending between headers 24. The pipe 22 from the condenser 6 extends into one end of the uppermost tube 23 for delivering refrigerant thereto. Cups 25 in the headers 24 receive refrigerant flowing from the end of each tube and direct it into the next lowermost tube so that refrigerant flows successively through the tubes from the top to the bottom of the evaporator. The headers 24 communicate with the interior of the absorber 8 to permit refrigerant vapor evaporated in the evaporator 7 to flow to the absorber. Mounted in the absorber 8 is a bank of cooling coils 26 to which cooling water is supplied through the header 27 and supply pipe 28 from any suitable source such as a city water main, cooling tower or the like. Cooling water from the bank of cooling coils 26 is delivered through a header 29 and conduit 30 to the inlet of the condenser 6 and is exhausted from the condenser through a conduit 31.

The absorption solution circuit comprises a path of flow for solution weak in refrigerant flowing from the separating chamber 12 of the generator 5 to the top of the absorber 8 and a path of flow for solution strong in refrigerant flowing from the bottom of the absorber to the inlet chamber 11 at the bottom of the generator. The path of flow for solution weak in refrigerant or, in other words, concentrated salt solution includes the conduit 32, inner passages of heat exchanger 9, conduit 33 and liquid distributor 34. The absorption solution is divided by the liquid distributor 34 for flow over the cooling coils 26 in the absorber 8. The path of flow for absorption solution strong in refrigerant or, in other words, dilute salt solution includes conduit 35, outer passages of the liquid heat exchanger 9 and conduit 36 to the inlet chamber 11 of the generator 5. The solution lifted in the tubes 10 of the generator 5 flows by gravity from the separating chamber 12 at the top of generator 5 to the liquid distributor 34 in the absorber 8 and from the bottom of the absorber to the inlet chamber 11 at the bottom of the generator.

The generator 5 and condenser 6 operate at pressure corresponding to the vapor pressure of the refrigerant at its condensing temperature and the evaporator 7 and absorber 8 operate at a lower pressure corresponding to the vapor pressure of refrigerant in the absorbent at the temperature of the absorbent. The difference in pressures in the condenser 6 and evaporator 7 is maintained by the orifice in the vessel 21 and the difference in pressures in the absorber 8 and generator 5 is maintained by liquid columns in the conduits 33 and 35. The liquid level in the conduit 35 is indicated by the reference character X while the liquid level in conduit 32 connected to the conduit 33 through the heat exchanger 9 is indicated by the reference character Y.

A purge device 37 is provided for continuously withdrawing non-condensable gases from the absorber 8 and transferring them to an inactive part of the system. Suffice it to state herein that the purging device 37 is in the form of an auxiliary absorber connected to withdraw non-condensable gases from the absorber 8 and deliver the gases between alternate slugs of absorption solution through a fall tube pump 38 to the lower end of a riser tube 39. The non-condensable gases ascend through the riser tube 39 to a storage vessel 40 and the absorption solution flows through the connection 41 to the return conduit 35. The non-condensable gases may be removed from the storage vessel 40 from time to time by an exhaust pump 42.

A concentration control vessel 43 is connected to the lowermost cup 25 in the evaporator 7 by a conduit 44 and to a header 24 by a conduit 45. The bottom of the concentration control vessel 43 is connected to the inlet chamber 11 of the generator 5 by a conduit 46. During operation of the refrigeration system a quantity of liquid refrigerant, water, will be stored out of solution in a liquid column in conduit 46 and concentration vessel 43 and the height of the liquid column or quantity of liquid stored in the concentration vessel will vary with variations in the difference in pressure between the evaporator 7 and generator 5. As thus far described the refrigeration system is substantially identical with that illustrated and described in my prior Patent No. 2,456,455 except for the purge pump and concentration vessel and their connections.

In accordance with the present invention the heat exchanger 9 is so constructed and arranged as to constitute a reservoir for absorption solution to maintain a hydrostatic reaction head of substantially constant height on the generator 5 while permitting variation in the amount of solution stored therein.

The combined heat exchanger and reservoir vessel 9 comprises a plurality of closed compartments 50 arranged in spaced side by side relationship in a casing 51 to provide alternate passages through and between said compartments for solution weak in refrigerant and solution strong in refrigerant, respectively. The lower portion of casing 51 encloses the compartments 50 and its upper portion extending above the compartments to provide a reservoir chamber 52 for storing absorption solution. A vent tube 53 connects the top of reservoir chamber 52 to the separating chamber 12 to equalize the pressure on solution in the chamber with the pressure on the solution in the generator tubes 5. The compartments 50 are of the same construction as illustrated and described in detail in my prior Patent No. 2,456,455, referred to above. Suffice it to state herein that each compartment 50 comprises a pair of reversed plates 54 having offset peripheral flanges 55 welded together to provide an enclosed space therebetween. Each plate 54 has bosses 56 projecting from opposite sides thereof for abutting engagement with similar bosses on adjacent plates to hold the plates of each compartment in space relationship and the plurality of compartments spaced from each other. The compartments 50 have openings 57 at the top connected by a header 58 and openings 59 at the bottom connected by a header 60. While the compartments 50 may have other shapes they are preferably of octagonal outline with their lower portions conforming to the bottom of the casing 51 on which the flanges 55 seat. With such a construction the entire area of the plates 54 and headers 58 and 60 constitute heat transfer surfaces without any pockets of stagnant liquid in the direction of flow. Conduit 32 connects the bottom of the separating chamber 12 to the upper header 58 and conduit 33 connects the lower header 60 to the liquid distributor 34 at the top of the absorber 8. Thus, the passages through the compartments 50 constitute a path of flow for solution weak in refrigerant flowing from the generator 5 to the absorber 8. Conduit 35 connects the bottom of the absorber 8 to the bottom of the casing 51 and conduit 36 connects the side of the casing above the compartments 50 to the inlet chamber 11 of the generator 5. Thus, the passages between the compartments 50 and between the compartments and the side of the casing 51 constitute a path of flow for solution strong in refrigerant flowing from the absorber 8 to the generator 5.

The chamber 52 above the compartments 50 in heat exchanger 9 constitutes a reservoir for solution strong in refrigerant which will stand at some level Z in chamber 52 to maintain a hydrostatic head of a predetermined height on the inlet chamber 11 of generator 5. Due to the relatively large cross-sectional area of chamber 52, changes in the amount of solution in the chamber will produce only very slight changes in the height of the liquid level so as to maintain the hydrostatic reaction head substantially constant. Also, the warmer solution from the generator 5 flows through the inner passages while the relatively cooler solution from the absorber flows through the outer passages and between the compartments 50 and sides of the casing 51 to reduce the heat loss from the heat exchanger 9. One form of the invention having now been described in detail, the mode of operation is explained as follows.

Between periods of operation the absorption solution will have drained into the combined heat exchanger and reservoir vessel 9 and will stand at the same level above the level Z in reservoir chamber 52 and generator tubes 10. To initiate a cycle of operation steam or other heating medium is supplied through the conduit 17 to the chamber 14 of generator 5 and its heat is transferred through the walls of the tubes 10 to expel refrigerant vapor from absorption solution. The vapor at low pressure will rise through the tubes with considerable velocity and lift absorption solution from which the vapor has been expelled into the separating chamber 12. Refrigerant vapor then flows from the separating chamber 12 through the conduit 20 to condenser 6 wherein it is liquefied and the liquid refrigerant flows by gravity through the conduit including the vessel 21 and pipe 22 into the top of the evaporator 7.

The absorption solution weak in refrigerant flows by gravity from the separating chamber 12 to the liquid distributor 34 in the absorber 8 in the path of flow including the conduit 32, compartments 50 of the heat exchanger 9 and conduit 33. The solution is divided by liquid distributor 34 for gravity flow over the coils 26 in the absorber 8 in thin films to produce a comparatively large surface area for absorption of refrigerant vapor flowing from the evaporator tubes 23 through the headers 24. The absorption of refrigerant vapor in the absorber 8 reduces the pressure in the evaporator 7 to the vapor pressure of the refrigerant in the absorbent at the temperature of the cooling water which causes evaporation of refrigerant in the evaporator at that pressure to produce a refrigerating effect on a medium, such as air, passing over the exterior of the evaporator tubes 23.

Solution will be withdrawn continuously from the reservoir chamber 52 and delivered to the absorber 8 until such time as the solution flows back from the absorber 8 to the casing 51 of the heat exchanger 9 at the same rate as it is delivered to the liquid distributor. At such time a condition of equilibrium will have been reached when the solution stands at some level such as Z to maintain a hydrostatic reaction head of a predetermined height on the solution in the tubes 10. During operation of the refrigeration system conditions may change so that more or less solution is stored in the reservoir chamber 51 but due to its relatively large cross-sectional area such changes will have little effect on the height of hydrostatic reaction head. With a substantially constant reaction head and heat transfer in generator 5, a substantially constant amount of solution will be delivered from the generator 5 to the absorber 8. The solution flowing from the absorber 8 enters the casing 51 of combined heat exchanger and reservoir vessel 9 at the bottom thereof and flows upwardly in the passages between the space compartments 50 and between the end compartments and side walls of the casing to replace the liquid being withdrawn through conduit 36. Thus, the only heat loss in the heat exchanger 9 is from the relatively cold solution.

During operation of the system a measured small quantity of absorption solution weak in refrigerant flows through the auxiliary absorber 37 to withdraw non-condensable gases from the absorber 8 and deliver them through the fall tube pump 38 to the lower end of the riser tube 39. The non-condensable gases ascend in the riser tube 30 and enter storage vessel 40 and the solution flows through the conduits 41 and 35 to the casing 51 of the heat exchanger.

Any unevaporated liquid refrigerant will flow from the lowermost tube 23 of the evaporator 7 into the concentration vessel 43 and be stored therein to increase the concentration of the remaining absorption solution. Such storage of liquid refrigerant in the concentration vessel 43 will reduce the amount of liquid circulating in the system but due to the relatively large cross-sectional area of the reservoir 52 such storage of liquid will have little effect on the hydrostatic reaction head on the generator 5. The refrigeration system will continue to operate in the manner explained above until the supply of heat to the generator 5 is shut off, at which time the solution and refrigerant will drain to the lowermost part of the system and accumulate in the reservoir chamber 52.

It will now be observed that the present invention provides a combined heat exchanger and reservoir vessel in a unitary structure for transferring heat between solution in different paths of flow and maintaining a substantially constant hydrostatic reaction head on the vapor liquid lift. It will also be observed that the present invention provides a combined heat exchanger and reservoir vessel in the absorption solution circuit having heat exchange means in the lower portion of the vessel and a reservoir chamber above the heat exchange means. It will still further be observed that the present invention provides a combined heat exchanger and reservoir vessel which reduces the space requirements, requires fewer parts and less material and reduces the heat loss from the system.

While a single embodiment of the invention is herein illustrated and described, it will be understood that modifications may be made in the construction and arrangement of elements without departing from the spirit or scope of the invention. Therefore, without limitation in this respect the invention is defined by the following claim.

I claim:

In an absorption refrigeration system, a circuit for absorption solution comprising a generator, an absorber, conduit means connecting the generator and absorber to provide a path of flow from the generator to the absorber for absorption solution weak in refrigerant and a path of flow from the absorber to the generator for absorption solution strong in refrigerant, said generator having at least one upright tube in which solution is lifted by vapor expelled therefrom, and a combined heat exchanger and reservoir vessel adjacent the generator and comprising a casing forming a unitary chamber connected in the path for solution strong in refrigerant, heat exchange structure in the lower part of the chamber and connected in the path for solution weak in refrigerant, said chamber being of a height to provide a storage space above the heat exchange structure for storing solution and maintaining a hydrostatic reaction head on the vapor liquid-lift tube, and said chamber having a cross-sectional area to maintain a substantially constant liquid level with varying operating conditions during operation of the system.

References Cited in the file of this patent

UNITED STATES PATENTS

| Number | Name | Date |
|---|---|---|
| 2,091,757 | Hanny | Aug. 31, 1937 |
| 2,122,361 | Ullstrand | June 28, 1938 |
| 2,247,107 | Waterfill | June 24, 1941 |
| 2,287,281 | Thomas | June 23, 1942 |
| 2,399,922 | Grossman | May 7, 1946 |
| 2,456,455 | Simpson | Dec. 14, 1948 |
| 2,513,124 | Weiks | June 27, 1950 |